United States Patent [19]

Koga

[11] Patent Number: 5,689,658
[45] Date of Patent: Nov. 18, 1997

[54] DATA PROCESSING SYSTEM

[75] Inventor: Miho Koga, Yokohama, Japan

[73] Assignee: Kabushiki Kaisha Toshiba, Kawasaki, Japan

[21] Appl. No.: 724,815

[22] Filed: Oct. 2, 1996

Related U.S. Application Data

[63] Continuation of Ser. No. 401,616, Mar. 9, 1995, abandoned.

[30] Foreign Application Priority Data

Mar. 9, 1994 [JP] Japan ................. 6-038145

[51] Int. Cl.⁶ ........................................ G06F 13/00
[52] U.S. Cl. ................. 395/304; 395/280; 395/555
[58] Field of Search ........................ 395/280, 551, 395/304

[56] References Cited

U.S. PATENT DOCUMENTS 4,617,642  10/1986  Clark ........................... 395/311
4,648,102  3/1987   Riso et al. ..................... 395/307
5,450,458  9/1995   Price et al. .................... 375/356

*Primary Examiner*—Jack B. Harvey
*Assistant Examiner*—David A. Wiley
*Attorney, Agent, or Firm*—Oblon, Spivak, McClelland, Maier & Neustadt, P.C.

[57] ABSTRACT

A data processing system has a processor, a RAM, an arithmetic unit, an address bus, a data bus, a state unit, and a bus controller. The state unit checks a front half and a rear half of a bus cycle of the processor, and generates a control signal indicating the front half and the rear half of the bus cycle. The bus controller receives the control signal, and based on the received control signal, indicates to the arithmetic unit receiving data transmitted from the RAM during the front half of the bus cycle, and to the processor receiving data transmitted from the arithmetic unit during the rear half of the bus cycle through the data bus.

11 Claims, 12 Drawing Sheets

FIG.10A

| 0 1 2 | | 21 22 | 29 30 31 |
|---|---|---|---|
| 0 0 | x x x x x x x x x x x x x x x x x x x | RADR | X X |

FIG.10B

| 0 1 2 | 8 9 10 11 12 13 | | | 20 21 22 | 29 30 31 |
|---|---|---|---|---|---|
| 1 0 | x x x x x | RADRH | IRND IXM IXY | X | RADRL | X X |

1

DATA PROCESSING SYSTEM

This application is a continuation of application Ser. No. 08/401,616, filed on Mar. 9, 1995, now abandoned.

BACKGROUND OF THE INVENTION

1. Field of the Invention

The present invention relates to a data processing system, and, in particular, to a data processing system comprising a plurality of device units such as a microprocessor, a memory, and an arithmetic unit, and the like for driving a data bus, wherein it is possible to drive the data bus by a plurality of the device units within one bus cycle, so that processing efficiency of the entire data processing system can be improved.

2. Description of the Prior Art

FIG.1 is a configuration drawing of a conventional data processing system.

The conventional example of the data processing system shown in FIG.1 is a data processing system comprising a microprocessor, a RAM, and an arithmetic unit for driving a data bus. In actually, as shown in FIG. 1, the data processing system comprises a microprocessor 101 (hereinafter it is called as "a processor 101") a bus controller 107, a RAM 103, an arithmetic unit 105, a bi-directional buffer 111, a source register 112, and an output buffer 113.

The processor 101 operates synchronously with a basic clock signal BCLK and a double frequency clock signal CLK. Hereinafter, the expression "clock signal" simply refers to the single-frequency basic clock signal BCLK.

Data is transmitted from the source register 112 to the arithmetic unit 105. The calculation results by the arithmetic unit 105 are transmitted to the data bus DB via the output buffer 113.

The bus controller 107 receives an address strobe signal AS and a read/write signal RW from a controller bus CB and one part of an address signal from an address bus AB, and generates control signals for the RAM 103, the bi-directional buffer 111, the source register 112, and the output buffer 113. Here, the address stop signal AS is a signal showing that the read/write signal RW and address signals A00 to A29 are valid. The address strobe signal AS is a low active (negative logic) signal.

In this conventional data processing system, source data is first read out from the RAM 103 during a bus cycle of the processor 101. Next, source data read out from the RAM 103 for an arithmetic operation is written into the source register 112. Following this, the processor 101 reads the arithmetic results during the read bus cycle.

The source register 112 and the output buffer 113 are addressed respectively. When the address transmitted on the address bus AB agrees with these addresses during the bus cycle of the processor 101, control signals LATE and AOE become active state or change to a low level, as shown in FIG. 2.

In the conventional data processing system shown in FIG. 1, when the address signal A00='0' and the address A01='0', the RAM 103 is accessed. When the address signal A00='1' and the address A01='0', the source register 112 is accessed. And when the address signal A00='1' and the address A01='1', the output buffer 113 is accessed.

The source register 112 latches the data on the data bus DB at the rising edge of the control signal LATE and transmits this latched data to the arithmetic unit 105. In addition, the output buffer 113 transfers the results of the arithmetic results transmitted from the arithmetic unit 105 onto the data bus DB when the control signal AOE is activated (low level).

The RAM 103 is connected to the data bus DB through the bi-directional buffer 111. One portion of address on the address bus AB is provided as address to the RAM 103. Also, the RAM 103 receives the read/write signal RW on the control bus CB and a chip enable signal CE activated or changed to a low level when the address of the RAM 103 is accessed for control.

The RAM 103 receives data addressed by using address on the data bus DB at a rising edge of the chip enable signal CE during the read/write signal RW indicates a write operation ('0': low level).

In addition, data indicated by address is read out from the RAM 103 when the chip enable signal CE is activated ("0": a low level) and the read/write signal RW designates a read operation "1": a low level).

The directions of readout/write-in operations in the bi-directional buffer 111 are controlled by the read/write signal RW. In addition, the output from the bi-directional buffer 111 is controlled by a control signal EN, and, in the case of a read operation, the chip enable signal CE is activated (the low level) and the data is transferred. In the case of a write operation, the control signal EN is inactivated (a high level) and the data is transmitted into the RAM 103.

FIG.2 is a timing chart of the conventional data processing system shown in FIG. 1, wherein data stored in the RAM 103 is calculated by the arithmetic unit 105.

In the read bus cycle of a clock 1, data to be set into the register 112 is stored in a part in the RAM 103, which part is designated by an address on the address bus AB. This address for this part in the RAM 103 is transferred onto the address bus AB. Based on this address on the address bus AB, the data in the RAM 103 is transferred onto the data bus DB. The processor 101 reads the data on the data bus DB which is transferred from the RAM 103 designated by this address on the address bus AB.

In the write bus cycle of a clock 2, the processor 101 transfers the address of the source register 112 to the address bus AB and transfers the data to be set in the source register 112 to the data bus DB. The source register 112 latches the data on the data bus DB at the rising edge of the control signal LATE and transfers this data to the arithmetic unit 105.

Next, in the read bus cycle of a clock signal 3, the control signal AOE is activated (or changed to the low level) when the processor 101 transfers the address of the output buffer 113 to the address bus AB, and arithmetic results from the arithmetic unit 105 are transmitted to the data bus DB and are read by the processor 101.

In an actual program, the above arithmetic processes are expressed as the following two instructions.

mov @ ram$_{13}$ add, @ src15$_{13}$ adr (instruction 1)

mov @ buff16$_{13}$ adr, r0 (instruction 2)

The mov instruction is a data transfer instruction with the first operand as the source and the second operand as the destination. r0 is an internal register in the processor 101. @ ram$_{13}$ add designates the address of the RAM 103, while @ src15$_{13}$ adr and @ buff16$_{13}$ adr are the addresses of the source register 112 and the output register 113 respectively.

By the instruction 1, the value stored in the address @ ram$_{13}$ add of the RAM 103 is written into the source register 112. This instruction must be performed in two bus cycles. In the initial bus cycle, the data transferred from the RAM 103 is read by the processor 101. In the next bus cycle the processor 101 writes this data into the source register 112 through the data bus DB.

By the instruction 2, the multiplication result is read into an internal register r0 in the processor 101. By these two instructions the value stored in the address @ $ram_{13}$ add of the RAM 103 is transmitted into the arithmetic unit 105 and the arithmetic results are stored in the internal register r0 in the processor 101.

In order to perform the above-mentioned RAM access operation and arithmetic operation, the bus controller 107 has the configuration shown in FIG.3.

The signal MA (active:a low level) which indicates access of the RAM 103, the signal LA (active:a low level) which indicates access of the source register 112, and the signal RA (active:a low level) which indicates access of the output buffer 113 are generated from the address signals A00, A01.

When the address strobe signal AS is activated (or changed to the low level) with the access signal MA activated (at the low level), the chip enable signal CE is activated (or changed to the low level). In addition to this, if the read/write signal RW indicates a read operation ('1': the high level) the control signal EN is also activated (or changed to the low level).

When the access signal LA is activated (or in the low level) and the read/write signal RW indicates the write operation C"0": the low level), and if the address strobe signal AS is activated (or in the low level), the control signal LATE becomes "0" (the low level).

If the access signal RA is activated (in the low level), the read/write signal RW indicates the read operation ('1': the high level), and if the address strobe signal AS is activated (or in the low level), the control signal AOE is activated (or changed to the low level).

In this manner described above, using a conventional data processing system comprising a plurality of devices for driving the data bus DB, it is necessary to control the data output of each device at every bus cycle so that there is no collision of data on the data bus DB.

As outlined above, in a conventional data processing system comprising a plurality of devices for driving the data bus, and operation of a buffer located in the data output side of each device must be controlled at each bus cycle.

The desired process is carried out with a plurality of bus cycles or a plurality of instructions, so there is the problem that the processing performance of the data processing system cannot be improved.

SUMMARY OF THE INVENTION

Accordingly, an object of the present invention is, with due consideration to the drawbacks of such conventional data processing systems, to provide a data processing system comprising a plurality of devices for driving a data bus, and during one bus cycle it is possible to drive the bus by means of the plurality of devices, so that an improvement of the total processing performance of the data processing system is obtained.

As a preferred embodiment of the present invention, a data processing system comprises:
processor means;
a first device;
a second device;
an address bus and a data bus through which the processor, the first device, and the second device are connected;
state means for checking a front half and a rear half of a bus cycle of the processor means, and generating a control signal indicating the front half and the rear half of the bus cycle; and control means for receiving the signal from the state means, and based on the received control signal, indicating to the second device receiving data transmitted from the first device during the front half of the bus cycle, and to the processor means receiving data transmitted from the second device during the rear half of the bus cycle through the data bus.

In the data processing system just described, the control means receives address data through the address bus, and indicates to the second device to receive the data from the first device only when the control signal indicates the front half of the bus cycle and the address indicates the first device.

In the data processing system described above a high level of the control signal indicates the front half of the bus cycle and a low level of the control signal indicates the rear half of the bus cycle.

In the data processing system described above, the processor means and the state means operate in synchronism with a clock signal transmitted from an external device, and the state means checks the front half of the bus cycle and the rear half of the bus cycle at a rising edge of the clock signal.

In the data processing system described above, the control means is a bus controller for receiving address data indicating the first device and the second device to be accessed through the address bus and the first device is a Random Access Memory for transmitting data stored therein based on the control of the control means and the second device is an arithmetic device.

As another preferred embodiment of the present invention, a data processing system comprises:
processor means;
first to n-th devices;
an address bus and a data bus through which the processor means, the first to n-th devices are connected;
state means for checking a front half and a rear half of a bus cycle of the processor means, and generating a control signal indicating the front half and the rear half of the bus cycle; and
control means for receiving address data through the address bus and transmitting a device control signal to the first to n-th devices to be accessed, and
when the bus cycle executed by the processor means is a bus cycle for accessing the device indicated by the device control signal transmitted from the control means and the control signal from the state means indicates the front half of the bus cycle, the control means indicates one of the first to n-th devices which are not selected by the device control means to transmit data therein and indicates the device indicated by the device control signal to receive the data through the data bus, and
when the bus cycle executed by the processor means is a bus cycle for accessing the device indicated by the device control signal transmitted from the control means and the control signal from the state means indicates the rear half of the bus cycle, the control means indicates the device selected by the address control signal to transmit data to the data bus and indicates the processor means to receive the data through the data bus.

In the data processing system just described, the first to n-th devices comprise first and second Random access memories and an arithmetic device.

In the data processing system described above, a high level of the control signal indicates the front half of the bus cycle and a low level of the control signal indicates the rear half of the bus cycle.

In the data processing system described above, the processor means and the state means operate in synchronism with a clock signal transmitted from an external device, and the state means checks the front half of the bus cycle and the rear half of the bus cycle at a rising edge of the clock signal.

BRIEF DESCRIPTION OF THE DRAWINGS

These and other objects, features, and advantages of the present invention will become more apparent from the following description of the preferred embodiments taken in conjunction with the accompanying drawings, in which:

FIG. 10A is a diagram for explaining an address format used by the data processing system as the second embodiment of the present invention shown in FIG. 8 in the case of accessing a RAM.

FIG. 10B is diagram for explaining an address format of the data processing system as the second embodiment of the present invention shown in FIG. 8 in the case of multiplication.

DETAILED DESCRIPTION OF THE PREFERRED EMBODIMENTS

Other features of this invention will become apparent in the course of the following description of exemplary embodiments which are given for illustration of the invention and are not intended to be limiting thereof.

Next, embodiments of the present invention will be explained with reference to the drawings.

Figure 1:
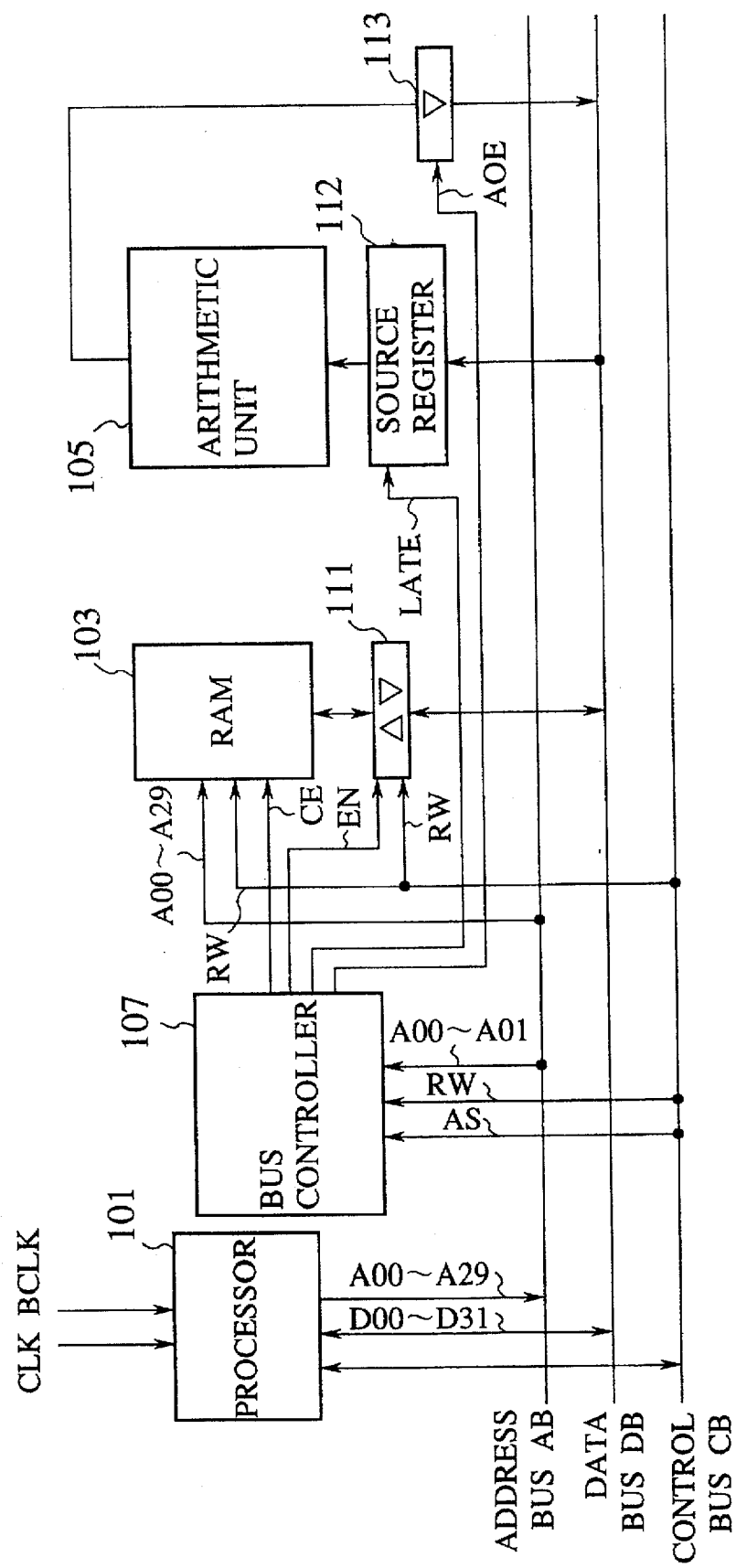
FIG. 1 is a configuration drawing for a conventional data processing system.
Figure 2:
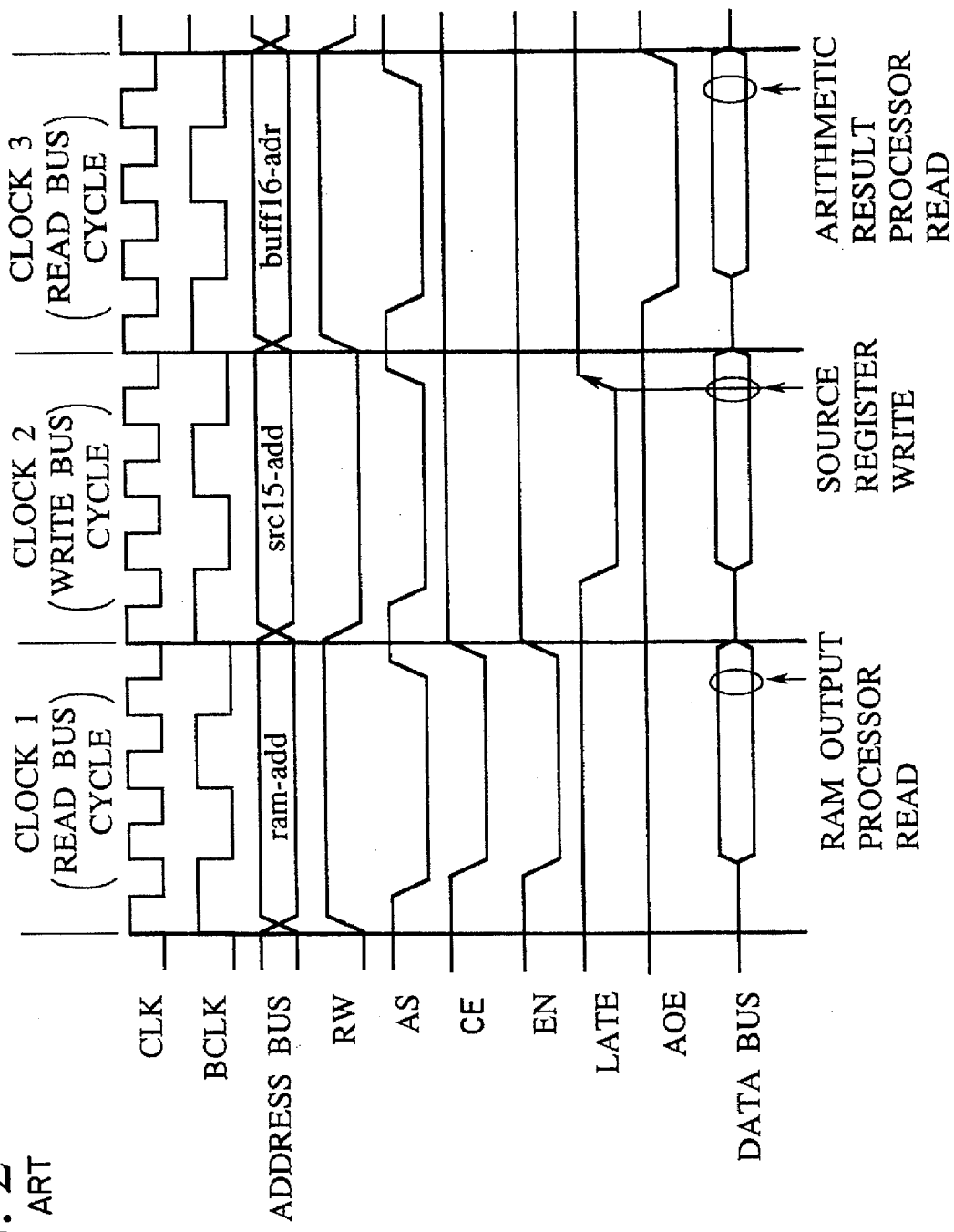
FIG. 2 is a timing chart for arithmetic operations by the conventional data processing system shown in FIG. 1.
Figure 3:
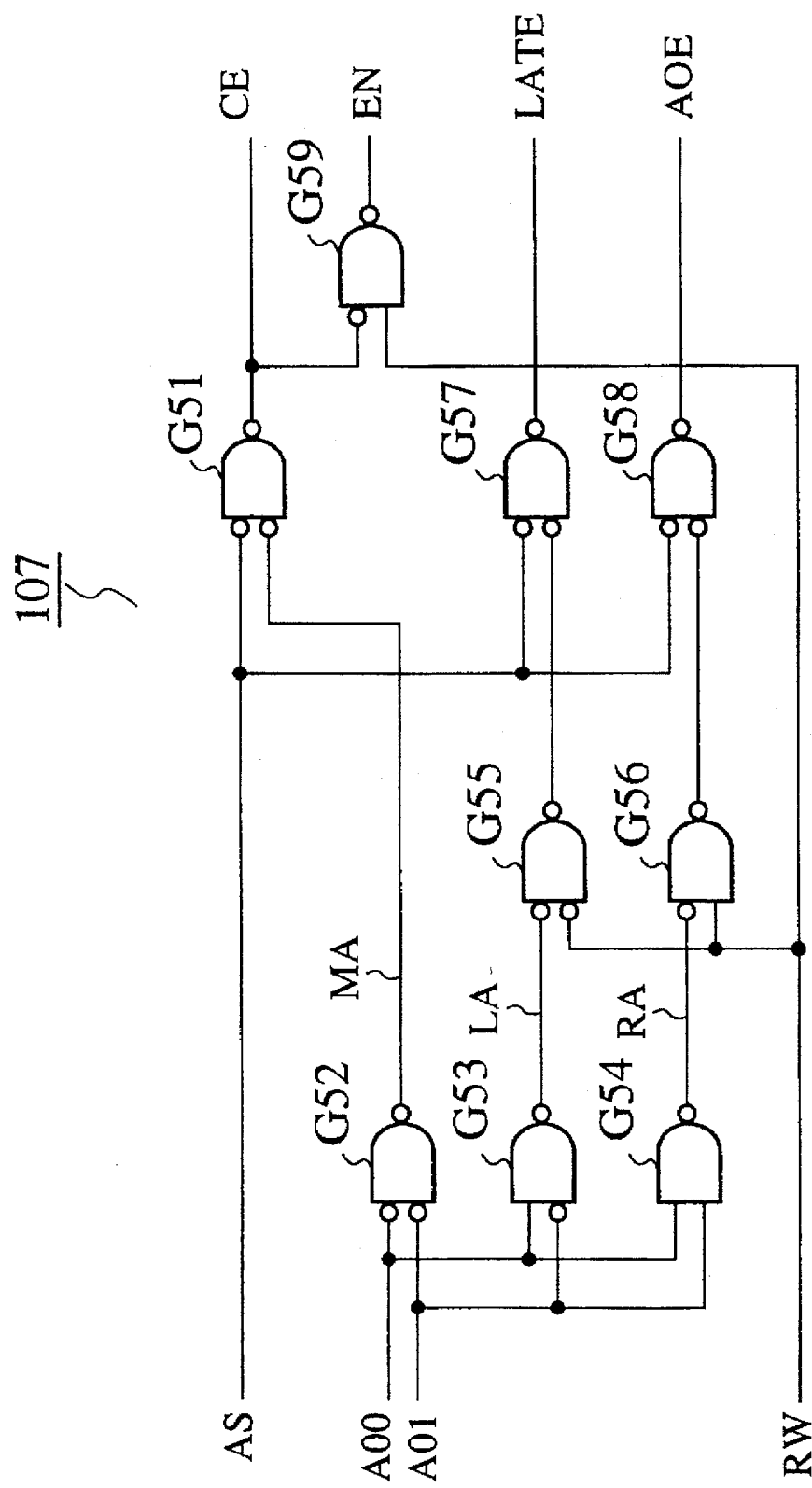
FIG. 3 is a circuit diagram for a bus controller used in the conventional data processing system shown in FIG. 1.
Figure 4:
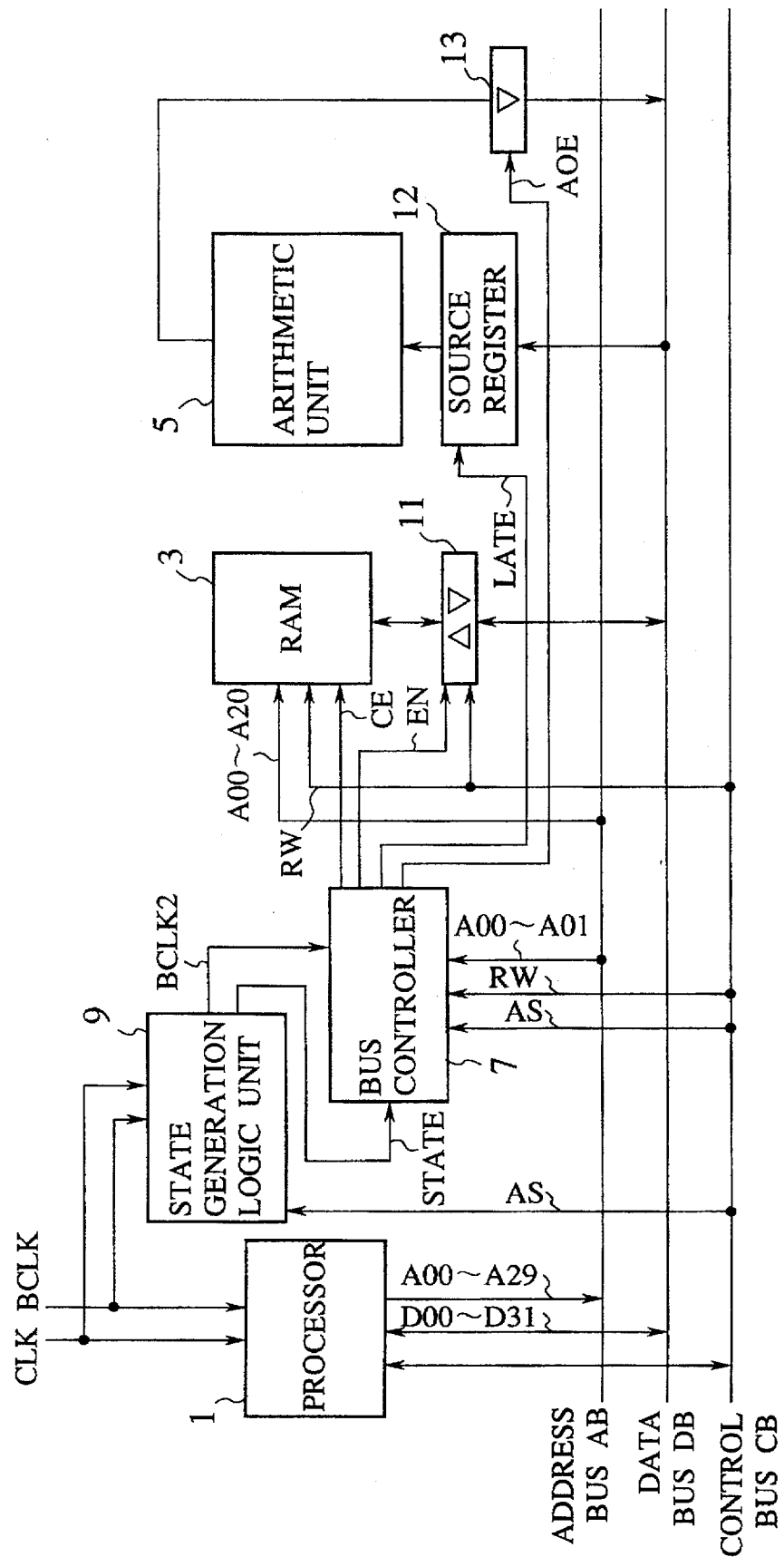
FIG. 4 is a configuration diagram of a data processing system as a first embodiment of the present invention.

FIG. 4 shows a configuration diagram of a data processing system as the first embodiment of the present invention.

A data processing system of the present invention, as illustrated in FIG. 4, comprises a processor 1, a state generation logic unit 9, a bus controller 7, a RAM 3, an arithmetic unit 5, a source register 12, a bi-directional buffer 11, and an output buffer 13.

The processor 1 operates in synchronization with a basic clock signal BCLK and a double frequency clock signal CLK. Hereinafter, the expression "clock signal" simply refers to the single-frequency basic clock signal BCLK.

The processor 1 is connected to an address bus AB, a data bus DB, and a control bus CB. The address signals A00 to A29 indicate addresses to be accessed by the processor 1 during the bus cycle operation. These address signals A00 to A29 are transmitted onto the address bus AB. The data signals D00 to D31 are connected to the data bus DB for data read/write operations.

In the read bus cycle, the processor 1 receives data onto the data signal lines D00 to D31. For a write bus cycle, the processor 1 transmits the data to the lines for the data signals D00 to D31. A read/write signal RW indicates whether the bus cycle is a read cycle or a write cycle.

By the processor 1, the read/write signal RW is at "1" (a high level) during a read bus cycle, and at "0 (a low level) during a write bus cycle. Also, the address strobe signal AS is activated "0": a low level) by the processor 1 during the bus cycle. The lines for the read/write signal RW and the address strobe signal AS are connected to the control bus CB.

The state generation logic unit 9 receives the clock signal CLK, the basic clock signal BCLK, and the address strobe signal AS and generates a state signal STATE for indicating the front and rear halves of the bus cycle and a second clock signal BCLK2. The second clock signal BCLK2 delays the basic clock signal BCLK by half a clock signal. These signals are transmitted into the bus controller 7.

The bus controller 7 is a circuit for controlling an access operation to the RAM 3, a data write operation to the source register 12, and for controlling the output buffer 13 for transferring the results of the arithmetic operation at the arithmetic unit 5. The bus controller 7 receives the address signals A00, A01 from the address bus AB, the address strobe signal AS from the control bus CB, and the read/write signal RW. Then, the bus controller 7 transmits the chip enable signal CE to the RAM 3, the control signal EN to the bi-directional buffer 11, and the control signal LATE to the source register 12, and the control signal AOE to the output buffer 13.

In addition, the RAM 3 is a memory for storing the data and programs, and is connected to the data bus DB through the bi-directional buffer 11. One part of address bus AB is transmitted as an address to the RAM 3. The RAM 3 receives the read/write signal RW from the control bus CB and the chip enable signal CE from the bus controller 7.

The arithmetic unit 5 receives data from the source register 12 and transfers the arithmetic results to the data bus DB through the output buffer 13.

Next, the operation of the data processing system as the first embodiment shown in FIG. 4 will be described in detail. The operation of the data processing system is divided into a RAM access operation and an arithmetic operation.

In the first embodiment of the data processing system shown in FIG. 4, when the address signals A00="0" and A01="1" a normal RAM access operation occurs. When the address signals A00="0" and A01="0", and the address strobe signal AS is activated (or changed to the low level), the bus controller 7 activates (changes to the low level) the chip enable signal CE. In addition, when the read/write signal RW is "1" (the high level: read), the control signal EN is also activated (or changed to the low level). One part of the address bus AB is transmitted as an address to the RAM 3.

In addition, when the address signals A00="1" and A01="0" and the read/write signal RW indicates read, an arithmetic operation occurs.

Figure 5:
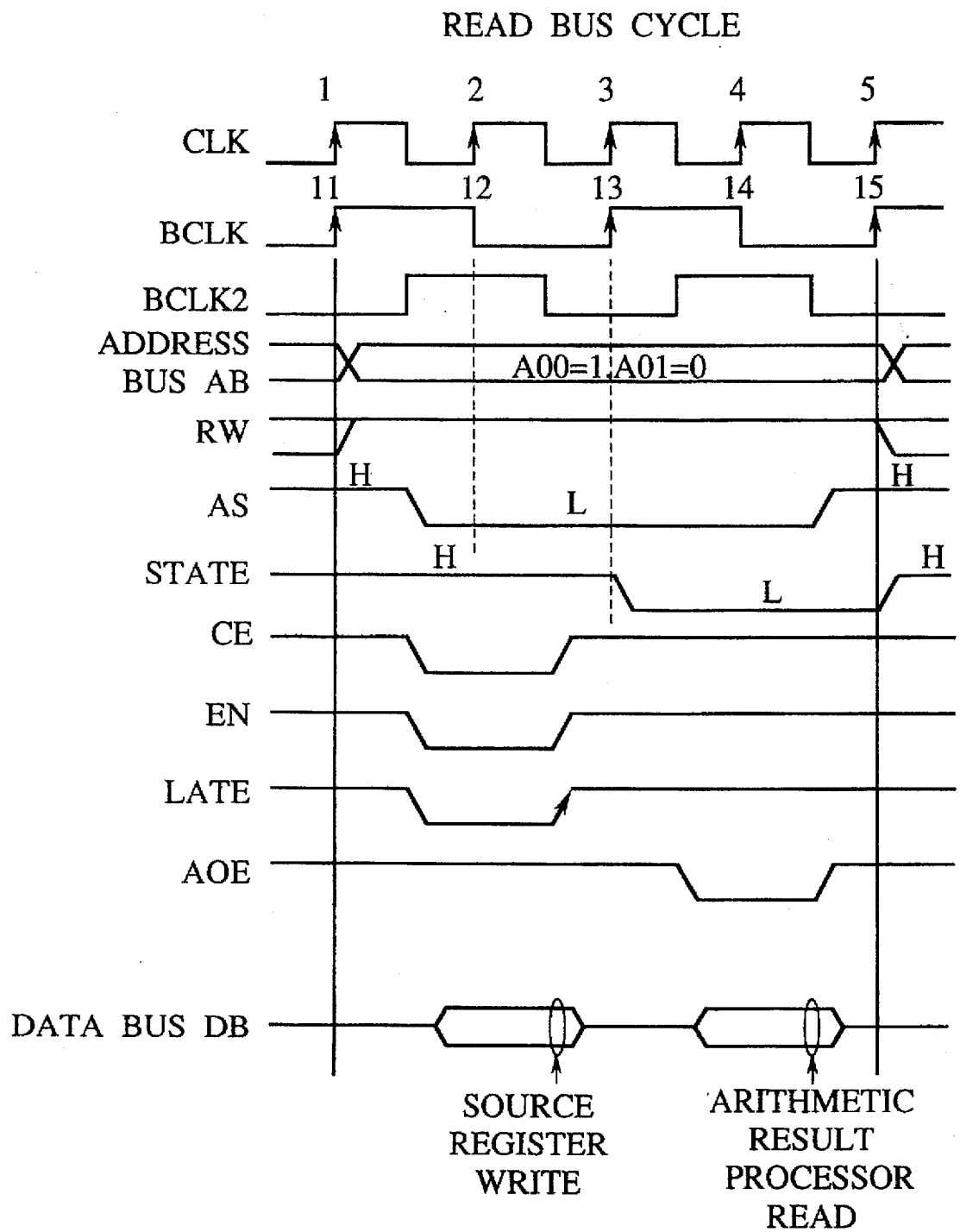
FIG. 5 is a timing chart for arithmetic operation in a first embodiment of the data processing system shown in FIG. 4.

FIG. 5 is a timing chart for the first embodiment of the data processing system of the present invention shown in FIG. 4 in the case of carrying out an arithmetic operation by the arithmetic unit 5 using the data stored in the RAM 3.

The arithmetic operation is completed in one read bus cycle in the first embodiment of the present invention. During the front half of the bus cycle, data is read out from the RAM 3 and then transmitted into the arithmetic unit 5, not to the processor 1, through the data bus DB. During the rear half of the bus cycle, the results transferred from the arithmetic unit 5 are read into the processor 1 through the data bus DB.

First, in the front half of the bus cycle, the state signal STATE generated by the state generation logic unit 9 is "1" (high level).

When the address signals A00="1" and A01="0", the read/write signal RW="1", the state signal STATE="1", and the second clock signal BCLK2="1", the chip enable signal CE, the control signal EN, and the control signal LATE are all activated "0": or changed to the low level), the data read out from the RAM 3 is transferred to the data bus DB, and is latched into the source register 12 at the rising edge of the control signal LATE.

In the rear half of the bus cycle, the state signal STATE is "0" (changes to the low level). At this time, the control signal AOE is activated (or changed to the low level), and the arithmetic results are transferred to the data bus BD and read into the processor 1.

Figure 6:
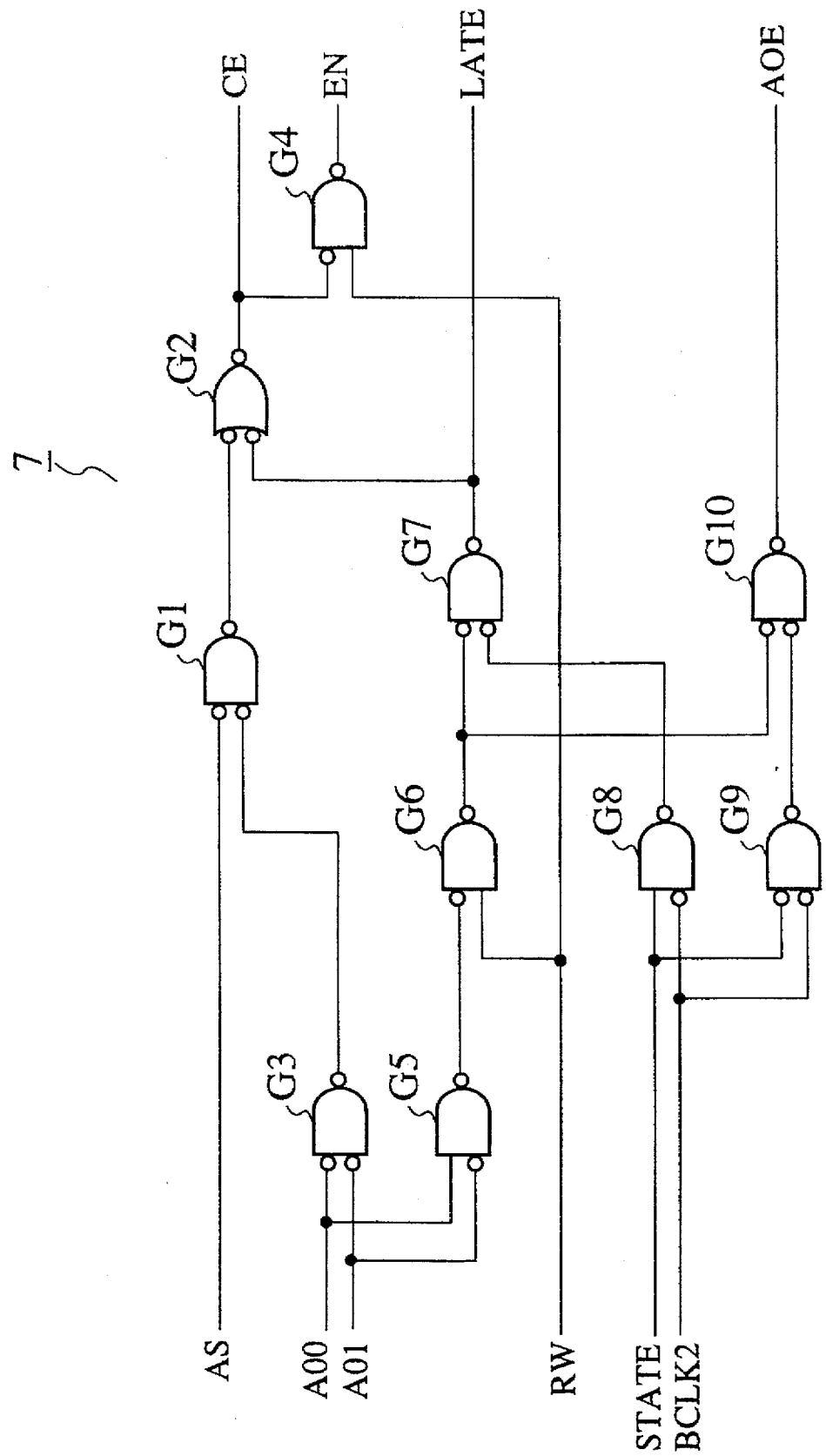
FIG. 6 is a circuit diagram for a bus controller in the data processing system as the first embodiment of the present invention shown in FIG. 4.
Figure 7:
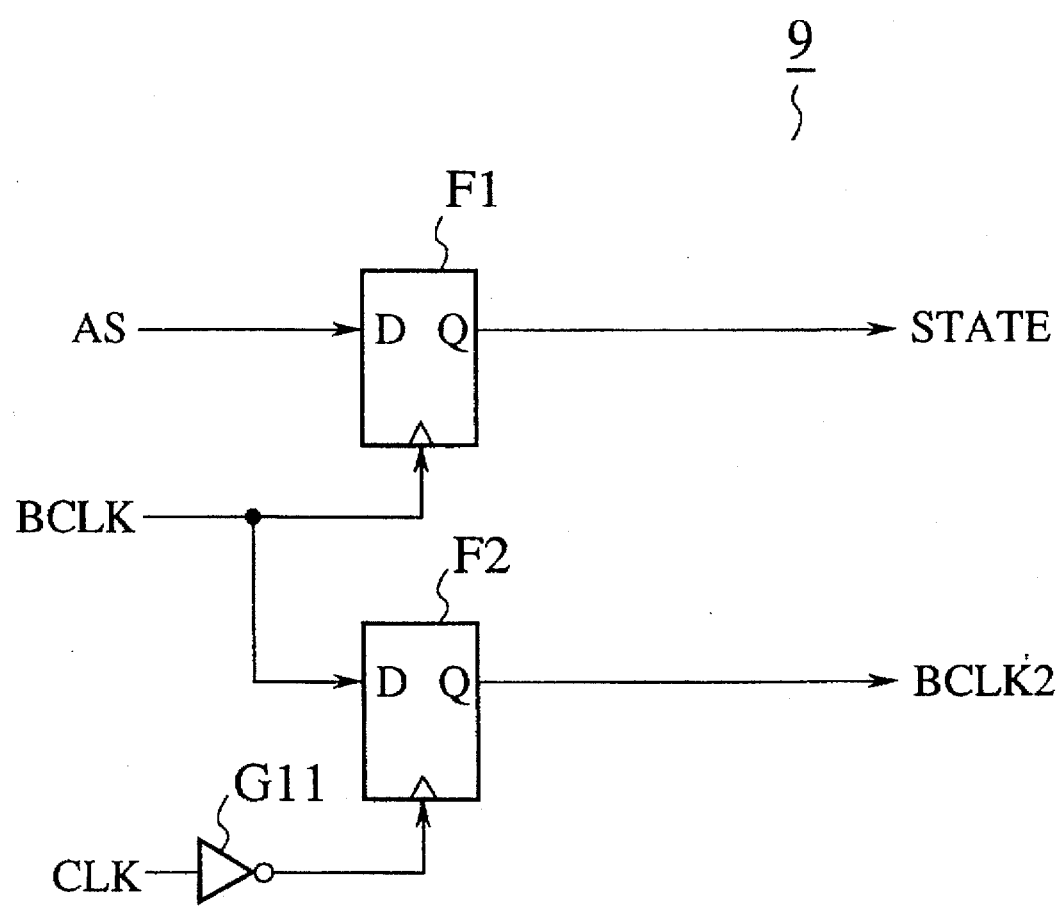
FIG. 7 is a diagram of a state generation logic unit in the data processing system as the first embodiment of the present invention shown in FIG. 4.

In order to implement the above type of RAM access operation and computation operation, the bus controller 7 and the state generation logic unit 9 have the configurations shown in FIG. 6 and FIG. 7 respectively.

In FIG. 7, the state signal STATE generated by the state generation logic unit 9 is generated from the address strobe signal AS and a flip-flop F1. Also, the second clock signal BCLK2 is generated by the delay of the basic clock signal BCLK by the flip-flop F2 for half a clock signal.

As shown in the timing chart of FIG. 5, the state generation logic unit 9 generates the state signal of the low level by a rising edge (designated by the reference number 13 shown in FIG. 5) of the basic clock signal BCLK while the address strobe signal SB is in the low level.

In addition, the state generation logic unit 9 generates the state signal of the high level by a rising edge (designated by the reference number 15 shown in FIG. 5) of the basic clock signal BCLK while the address strobe signal SB is in the high level.

In FIG. 6, the chip enable signal CE generated by the bus controller 7 and the control signal EN are generated by the address signal (A00="0", A01="1") and the address strobe signal AS in the case of RAM access.

The arithmetic operation is generated by the address signal (A00="1", A01="0"), the state signal STATE ("1": the high level), and the second clock signal BCLK2 ("1": the high level).

The control signal EN is activated (or changed to the low level) when the read/write signal RW is "read": the high level), added to the generation conditions of the chip enable signal CE described above.

In addition, the control signal LATE is generated by the address signal (A00="1", A01="0"), the state signal STATE ("1": the high level), and the second clock signal BCLK2 ("1": the high level). The control signal AOE is generated by the address signal (A00="1", A01="0"), the state signal STATE ("1": the low level) and the second clock signal BCLK2 ("1": the high level).

When the above arithmetic operation is explained by using an actual program, it is completed by one transmission instruction of the following type.

mov @ ope$_{13}$ add, r0.

Here, the first operand @ ope$_{13}$ add shows an arithmetic operation when the address signals A00="1", A01="0". One part of this address is supplied as an address to the RAM 3. r0 shows an internal register in the processor 1. In the front half of the bus cycle, data in the RAM 3 is read out by the address to be transmitted to the RAM 3 itself and this readout data is transmitted into the source register 12. In the rear half of the bus cycle, the arithmetic results transferred from the arithmetic unit 5 are read into the internal register r0 in the processor 1.

The configuration and the operation of the data processing system as in the first embodiment of the present invention has been explained above. As a result of this type of configuration and operation, the front half of the read bus cycle of the processor 1 is used to transmit data to the arithmetic unit 5 from the data bus DB. During the rear half of the bus cycle, the processor 1 can read out the arithmetic result from the arithmetic unit 5. Specifically, the processor 1 can complete the arithmetic operation in one read bus cycle. This is an important feature of the data processing system of the first embodiment of the present invention.

Figure 8:
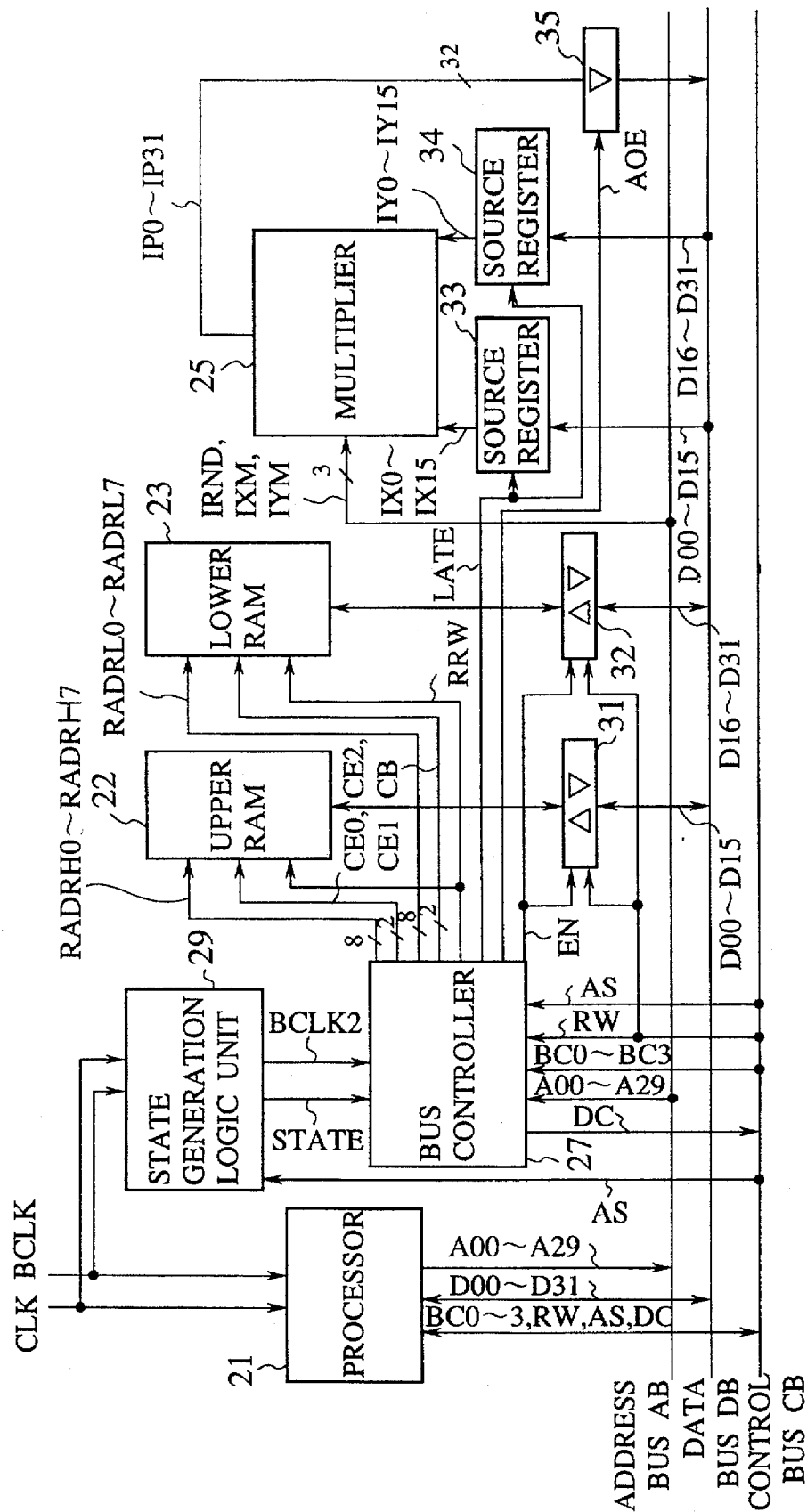
FIG. 8 is a configuration diagram of a data processing system as a second embodiment of the present invention.

Next, FIG. 8 is a configuration diagram of a data processing system as a second embodiment of the present invention.

The data processing system of the second embodiment of the present invention is an example using a multiplier as an arithmetic unit, and comprises a processor 21, a bus controller 27, a state generation logic unit 29, an upper order RAM 22, a lower order RAM 23, a multiplier 25, a pair of source registers 33, 34, a pair of bi-directional buffers 31, 32, and an output buffer 35.

The processor 21 operates synchronously with a basic clock signal BCLK and a double frequency clock signal CLK. Signals transmitted from the processor 21 are transferred to the address bus AB, the data bus DB, and the control bus CB. Address signals A00 to A29 are transmitted from the processor 21 to access during the bus cycle operation.

The address signals A00 to A29 are transferred to the address bus AB. The data signals D00 to D31 are used for reading and writing data, and their signals are transmitted to the data bus DB.

In a read bus cycle, the processor 21 receives or reads data of D00–D31 on the data bus DB. In a write bus cycle, the processor 21 transmits the data to the data signal lines D00 to D31.

Byte control signals BC0 to BC3 are signals which are activated (0: the low level) to correspond to byte positions accessed when the bus cycle is executed by the processor 21. When the byte control signals BC0, BC1, BC2, and BC3 are activated (or in the low level), these indicate that the data signals D00 to D07, D08 to D15, D16 to D23, and D24 to D31 are accessed.

The read/write signals RW indicate whether or not the bus cycle is a read or a write cycle. The processor 21 sets the read/write signal RW to "1" (the high level) for a read bus cycle and to "1" (the low level) for a write bus cycle.

The address strobe signal AS is activated ("0": the low level) by the processor 21 during a bus cycle. A data transmission completion signal DC controls the termination of the bus cycle. When an external circuit activates the data transmission completion signal DC ("0": the low level) the processor 21 completes the bus cycle by this clock signal.

The byte control signals BC0 to BC3, the read/write signal RW, the address strobe signal AS, and the data transmission completion signal DC are connected to the control bus CB.

The state generation logic unit 29 generates the state signal STATE indicating the front and rear halves of the bus cycle and the second clock signal BCLK2 which delays the basic clock signal BCLK by half a clock signal. These signals are transmitted into the bus controller 27.

The bus controller 27 is a circuit for accessing the upper order RAM 22 and the lower order RAM 23, for writing data into the source registers 33 and 34, and for controlling the output buffer 35 to transfer the arithmetic results from the multiplier 25.

The bus controller 27 receives the address signals A00 to A29, the byte control signals BC0 to BC3, the read/write signal RW, and the address strobe signal AS through the address bus AB and the control bus CB. Also, the state signal STATE and the second clock signal BCLK2 are transmitted from the state generation logic unit 29 to the bus controller 27.

The bus controller 27 transmits respectively address signals RADRH0 to RADRH7 and the chip enable signals CE0 and CE1 to the upper order RAM 22, address signals RADRL0 to RADRL7 and the chip enable signals CE2 and CE3 to the lower order RAM 23, and a read/write signal RRW and the control signal EN for the hi-directional buffers 31, 32 to the upper and lower order RAMs 22 and 23 in common.

The bus controller 27 transmits the control signal LATE to the source registers 33 and 34 for indicating the timing of the data latching of the source registers 33, 34 for the multiplier 25, and a control signal MOE for the output buffer 35 for the multiplier 25 to the output buffer 35.

The upper order RAM 22 and the lower order RAM 23 are memories for storing data and programs. The upper order RAM 22 is connected to the lines for the data signals D00 to D15 through the bi-directional buffer 31. The lower order RAM 23 is connected to the lines for the data signals D16 to D31 through the bi-directional buffer 32. Each word in the upper order RAM 22 and the lower order RAM 23 is selected by the address signals RADRH0 to RADRH7 and the address signals RADRL0 to RADRL7 respectively. In this second embodiment of the present invention there are eight addresses, therefore each RAM has 512 bytes.

Access is possible in byte units by means of the chip enable signals CE0 to CE3. When the chip enable signals CE0 to CE3 are activated "0": the low level) data is read from the upper order RAM 22 and the lower order RAM 23 and data is written into the upper order RAM 22 and the lower order RAM 23. When the read/write signal RRW is "1" (the high level), a read access occurs, and data is transferred by the upper order RAM 22 and the lower order RAM 23. When the read/write signal RRW is "0"(the low level), a write access occurs, and data is transferred by the upper order RAM 22 and the lower order RAM 23.

Sixteen bits of data IX0 to IX15 and sixteen bits of data IY0 to IY15 are transmitted into the multiplier 25, and 32 bits of data IP0 to IP31 are transferred from the multiplier 25. IXM and IYM indicate that the data items IX0 to IX15 and the data items IY0 to IY15 are either signed integers (IXM, IYM="1") or are unsigned integers (IXM, IYM="0"). The signed integers represent a complemental expression of 2.

In the case where the two input data items IX0 to IX15 and IY0 to IY15 are both unsigned integers (IXM="1", IYM="1"), the results of the arithmetic operation by the multiplier 25 are not signed. In the case where either one is an unsigned integer, the results of the multiplication by the multiplier 25 are also signed. IRND is a signal which specifies whether the upper order 16 bits of the multiplication results are rounded or not. Only when the signal IRND indicating the round is "1", "1" is added to the highest bit (IP15) of the lowest order 16 bits.

Figure 9:
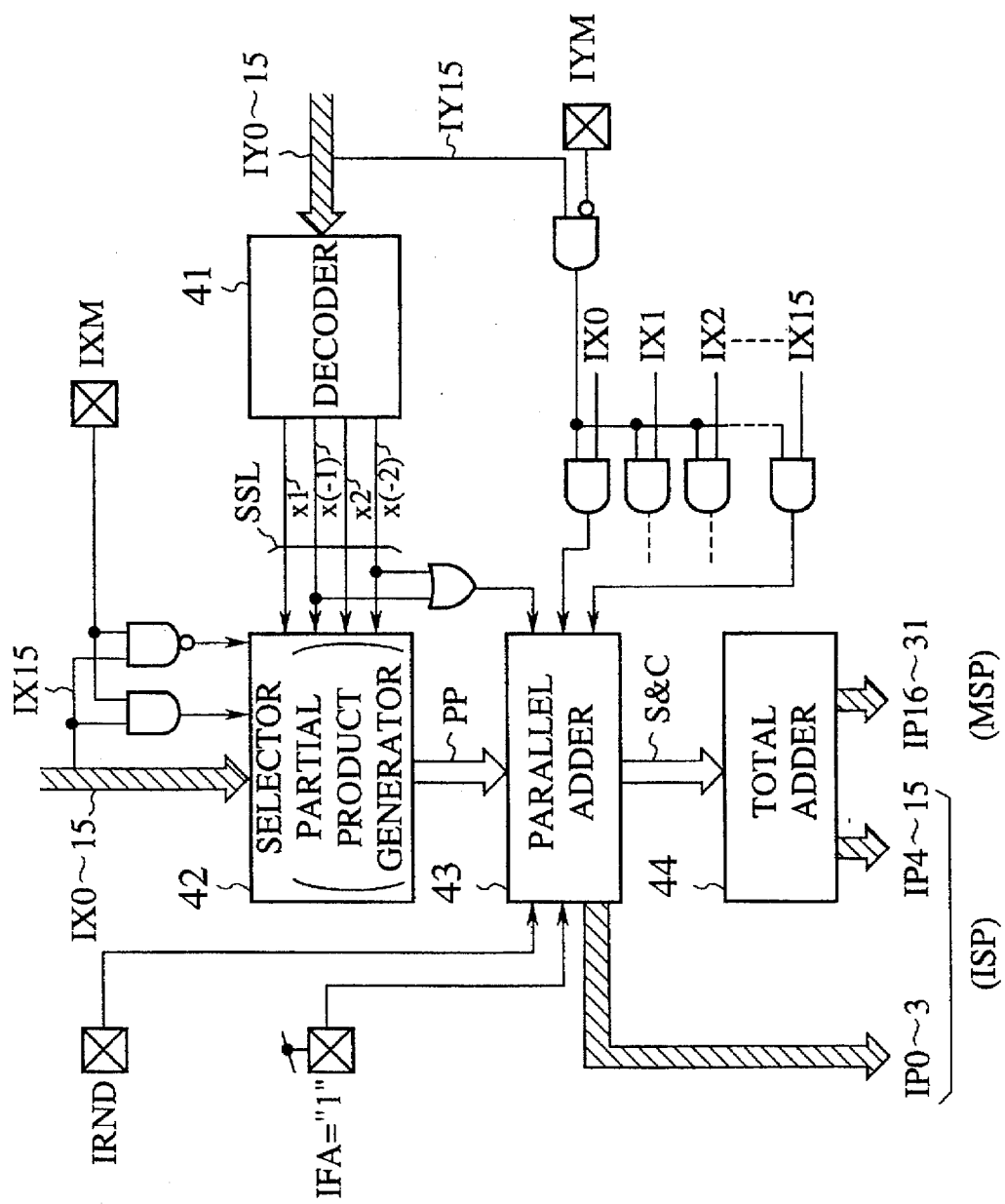
FIG. 9 is a configuration drawing for a multiplier in the data processing system as the second embodiment of the present invention shown in FIG. 8.

An example of this type of multiplier is Toshiba's Hard Macro-cell MP16 of the Standard Cell TC25S Series. FIG. 9 is a circuit configuration diagram of this multiplier. In FIG. 9, the main structural elements of the multiplier are a hi-dimensional Booth decoder 41 for generation a selection signal SSL, a selector 42 for generation partial products, a parallel adder 43 for parallel addition of a partial product PP, and a total adder 44 with a CLA (carry look ahead).

Next, the operation of the data processing system of the second embodiment of the data processing system will be described in detail. The operation of this embodiment of the data processing system is divided into a RAM access operation and a multiplication operation.

(1) RAM access operation

In the RAM access operation, the upper order RAM 22 and the lower order RAM 23 are normally accessed as a RAM of 32-bit width. The upper order RAM 22 and the lower order RAM 23 are accessed at the same address word.

FIG. 10A shows an example of the address format for this operation. A field RADR (address signals A22 to A29) is used in common as a RAM address (RADRH0 to RADRH7 and RADRL0 to RADRL7) for the upper order RAM 22 and the lower order RAM 23. Also, in the example shown in FIG. 10A, the high order addresses A00, A01="00" while the addresses A02 to A21 do not care.

In the RAM access operation, the chip enable signals CE0 to CE3 corresponding to the byte control signals BC0 to BC3 are activated or changed to the low level by the bus controller 27, and the upper order RAM 22 and the lower order RAM 23 are accessed in byte units. When the read/write signal RW is "1" in the read bus cycle, data is read out from the upper order RAM 22 and the lower order RAM 23 by setting the read/write signal RRW to "1".

Also, when the read/write signal RW is "0" in the write bus cycle, data is written into the upper order RAM 22 and the lower order RAM 23 on the data bus DB by setting the read/write signal RRW to "0".

The bus controller 27 transmits the address signals A22 to A29 as the address signals RADRH0 to RADRH7 and RADRL0 to RADRL7, and the upper order RAM 22 and the lower order RAM 23 are accessed at the same address word. In the RAM access state, the bi-directional buffers 31, 32 are enabled by the control signal EN and the operational directions of the bi-directional buffer 31 and 32 are controlled by the read/write signal RW.

When the read/write signal RW is "1"in the read bus cycle, the output of the upper order RAM 22 and the lower order RAM 23 is transferred onto the data bus DB. Also, when the read/write signal RW is "1" in the write bus cycle, data transferred from the processor 21 on the data bus DB is introduced into the upper order RAM 22 and the lower order RAM 23. Further, the output buffer 35 is in the disabled state and the output from the multiplier 25 is not transferred to the data bus DB. In this manner, the upper order RAM 22 and the lower order RAM 23 are accessed as a 32-bit RAM in the RAM access operation.

(1) Multiplication operation

Whether the operation is a multiplication operation or not is judged by the address signals A00 to A29 transferred by the processor 21 and by the read/write signal RW. When the address signals A00="1", A01="0", and the read/write signal RW is "1" (read bus cycle), a multiplication operation occurs.

In the multiplication operation, an independent field in the address transferred in the bus cycle is the RAM address (RADRH0 to RADRH7 and RADRL0 to RADRL7) for the upper order RAM 22 and the lower order RAM 23. As a result, independent word data from the upper order RAM 22 and the lower order RAM 23 can be read and used as multiplication source data.

FIG. 10B shows an example of the address format during a multiplication operation. The high order addresses are A00, A01="10", indicating that a multiplication operation is occurring. The addresses A10, A11, and A12 are connected to lines for a rounding specification signal IRND and integer discriminating signals IXM and IYM respectively, specifying the multiplication mode. The addresses A13 to A20 are the addresses RADRH0 to RADRH7 for the upper order RAM 22 and the addresses A22 to A29 are the addresses RADRL0 to RADRL7 for the lower order RAM 23. The words in the upper order RAM 22 and the lower order RAM 23 specified by these respective fields are read out.

In the multiplication operation, data read from the upper order RAM 22 is stored in the source register 33, and data read from the lower order RAM 23 is stored in the source register 34. The multiplication results IP01 to IP31 are transferred to the data bus DB through the output buffer 35.

In the multiplication operation, the bus controller 27 activates the chip enable signals CE0 to CE3. The read/write signal RRW becomes "1", and data is read out from the upper order RAM 22 and the lower order RAM 23. The bi-directional buffers 31 and 32 are enabled by the control signal EN. The operational directions of the bi-directional buffer 31 and 32 are controlled by the read/write signal RW.

The bus controller 27 transmits the addresses A13 to A20 to the upper order RAM 22 as the addresses RADRH0 to RADRH7, and the addresses A22 to A29 to the lower order RAM 23 as the addresses RADRL0 to RADRL7 respectively, and independent words in the upper order RAM 22 and the lower order RAM 23 are read out.

When the data read out of the upper order RAM 22 and the lower order RAM 23 is transferred to the data bus DB, the values of the data signals D00 to D15 are latched by the source register 33 and the values of the data signals D16 to D31 are latched in the source register 34 by the control signal LATE and supplied to the multiplier 25. The output buffer 35 is enabled by the control signal MOE and the arithmetic results from the multiplier 25 are transferred to the data bus DB. Accordingly, the processor 21 can execute a 16-bit multiplication in one read bus cycle.

Figure 11:
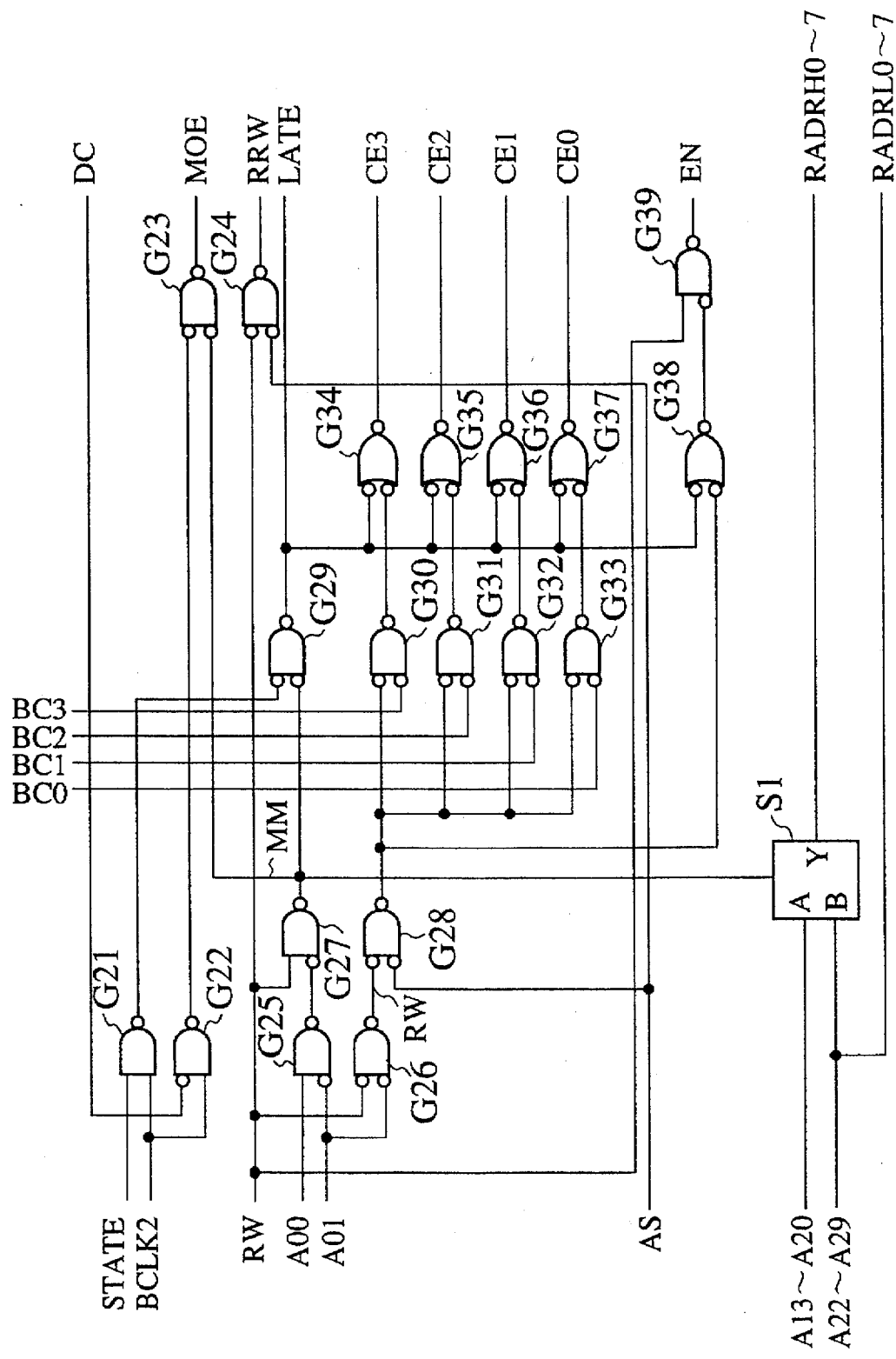
FIG. 11 is a circuit diagram for a bus controller in the data processing system as the second embodiment of the present invention shown in FIG. 8.

FIG. 11 is a configuration diagram for the bus controller 27 in the data processing system shown in FIG. 8 for implementing the above-mentioned RAM access and multiplication operations.

The read/write signal RRW for the upper order RAM 22 and the lower order RAM 23 is "0" (low level) only when the address strobe signal AS is activated ("0": the low level) in the write bus cycle by a gate G24.

The RAM is accessed when the address signals A00, A01="00", and a signal RM is activated "0": the low level). When the address signals A00, A01="10" and the read/write signal RW is "1", the multiplication operation occurs and a signal MM is activated ("0": the low level).

The chip enable signals CE0 to CE3 are activated "0": the low level) when the address strobe signal AS is activated in the RAM access operation. In the multiplication operation with the state signal STATE at "1" (the high level) the front half of the bus cycle is indicated, and is activated when the second clock signal BCLK2 is "1" (the high level).

During the multiplication with the signal MM activated, the addresses A13 to A20 are transferred to the upper order RAM 22 as the addresses RADRH0 to RADRH7 by a selector S1. In addition, the addresses A22 to A29 are transferred as the addresses RADRL0 to RADRL7. Also, the addresses A22 to A29 are transferred to the lower order RAM 23 as the addresses RADRL0 to RADRL7.

The bus controller 27 returns the data transfer completed signal DC to the processor 21 when the rear half of the bus cycle is indicated with the state signal STATE at "0"(the low level). Accordingly, the bus cycle is completed in one clock cycle.

In a multiplication operation, when the state signal STATE and second clock signal BCLK2 are "1" (the high level), the control signal LATE is "0"(the low level). When the second clock signal BCLK2 is "1" (the high level) with the state signal STATE "0" (the low level), the control signal AOE is "0" (the low level).

Figure 12:
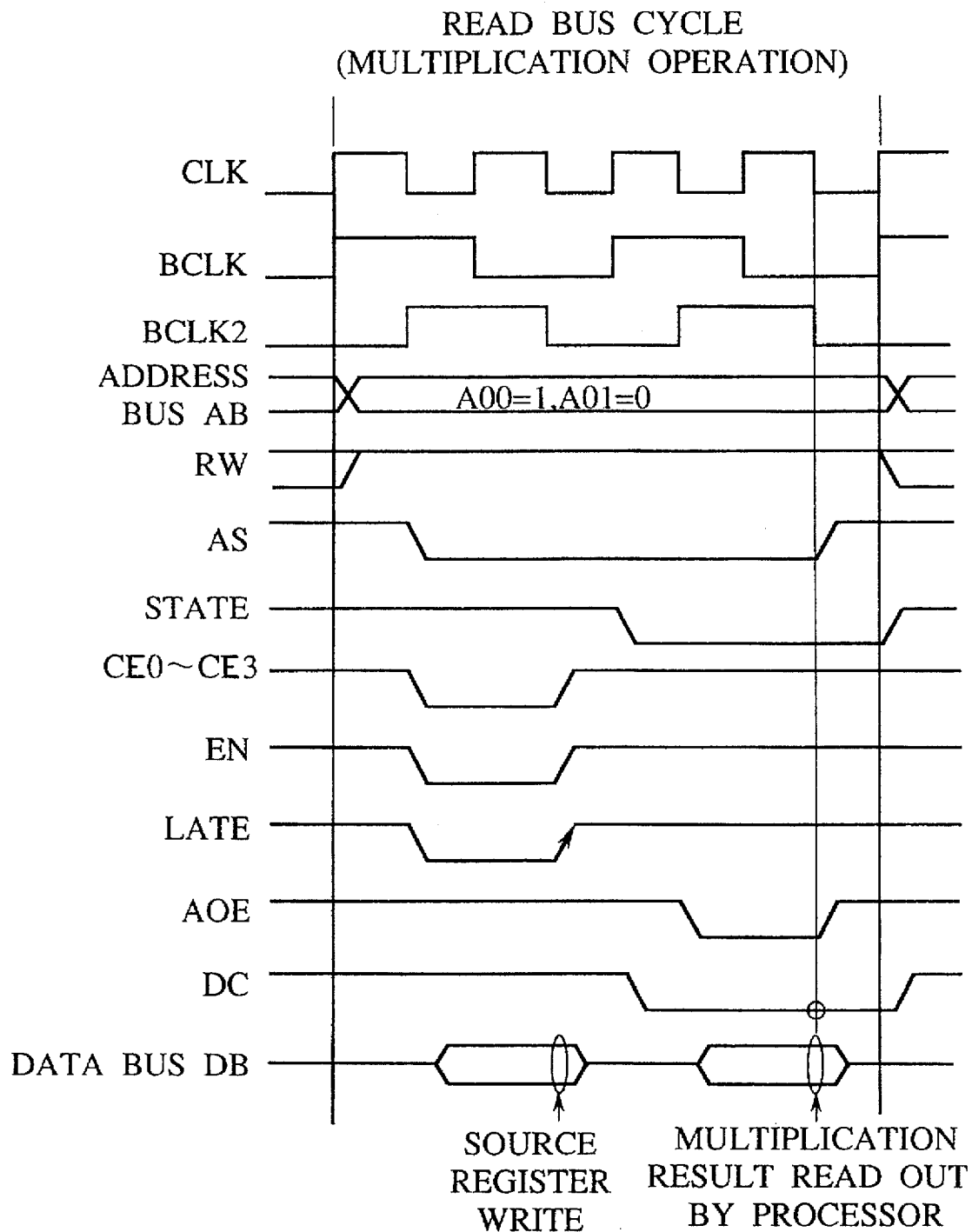
FIG. 12 is an operation timing chart for performing multiplication in the data processing system as the second embodiment of the present invention shown in FIG. 8.

FIG. 12 is a timing chart for the multiplication operation in the data processing system of the second embodiment of the present invention.

The processor 21 transmits an address shown in FIG. 10B. Here, the rounding specification signal IRND="0", the integer discriminating signals IXM and IYM="0"and "1" respectively, the RADRH field="A", and the RADRL field="B".

The bus controller 21 recognizes the address for the multiplication operation and activates ("0":the low level) the chip enable signals CE0 to CE3 and the control signal EN. The addresses of the RADRH field and the RADRL field are provided to the upper order RAM 22 and the lower order RAM 23 respectively and the data is transferred to the data bus DB. The control signal LATE is activated ("0": low level), and the contents of an address A which is transferred to the upper order RAM 22 and the contents of an address B which is transferred to the lower order RAM 23 at the rising edge of the control signal LATE are latched in the source registers 33 and 34 respectively. The data is transferred to the multiplier 25.

At the rear half of the bus cycle wherein the state signal STATE is "0" (the low level), the signal MOE is activated ("0":the low level), the multiplication results from the multiplier 25 are transferred to the data bus DB through the output buffer 35, and the processor 21 reads in the multiplication results.

Next, an example of programming will be given for the case where multiplication is performed by the data processing system as the second embodiment of the present invention shown in FIG. 8.

The multiplication is executed in one read bus cycle, therefore the following instruction is used to transfer from memory to the register:

mov @ mem, reg.

The first operand indicates memory read access, and if mem is set as the address value for the multiplication operation shown in FIG. 10B, the results of the multiplication are stored in the internal register reg of the processor 21.

For example, this can be considered as a command for multiplying unsigned data data1 with an address "h' AA"

stored in the upper order RAM 22 by unsigned data data2 with an address "h' C2" stored in the lower order RAM 23, and storing the results of this multiplication in 32 bits in an internal register r0 of the processor 21. Here, the "h' " preceding the number indicates that the number is expressed in hexadecimal.

In this case, the address for the multiplication operation shown in FIG. 10B is A00="1", A01="0"; A10 to A12="0" from the rounding specification signal IRND="0" and the integer discriminating signals IXM and IYM="0". In addition, because A13 to A20="h' AA", A22 to A29="h' C2", when the other bits are "0" the address signals A00 to A31 are "h' 80055308".

Accordingly, the product of the data data1 and the data data2 can be obtained from mov @ h' 80055308, r0 and stored in the internal register r0. If the result rounded to the upper order 16 bits only is stored in the internal register r0, the address A10="1" from the rounding specification signal IRND="1", and the read operation may be performed at a 16-bit width. The instruction in this case is as follows.

mov @ h' 80255308. h, rO. h

The "h" following each operand shows that the data is transmitted at a 16-bit width. Also, if the data is a signed integer, the read operation may be carried out from an address wherein the integer discriminating signals IXM and IYM are "1".

In the second embodiment of the data processing system of the present invention as explained above, during the front half of the read bus cycle of the processor 21 is used to transmit data to the multiplier 25 through the data bus DB, and it is possible to perform an operation whereby the multiplication results transferred from the multiplier 25 are read into the processor 21 during the rear half of the bus cycle. In this manner, it is possible to use the data bus DB efficiently in this embodiment of the data processing system.

The data processing system of the second embodiment of the present invention has the two RAMs 22 and 23 and the arithmetic unit 25. However this present invention is not limited to the first and second embodiments described above. By using the present invention, various modifications, alternate constructions and equivalents any be employed without departing from the true spirit and scope of the invention. For example, it may be acceptable that there are two or more arithmetic units and RAMs in a data processing system. In this case, a bus controller generates control signals which are transmitted to each of the RAMs and the arithmetic units to be accessed in order to control operations of these RAMs and the arithmetic units. These control signals are generated based on address data which indicates the RAMs and the arithmetic units to be accessed next. A state generation logic unit has the same configuration and the same function of that of the state generation logic unit 9 shown in FIG. 5.

As explained above, by means of the present invention one bus cycle performed by the processor 1 is divided into a front half and a rear half. In the front half of the bus cycle, the first drive device (memory means) transmits data transferred to the data bus to the second drive device (computing means). In the rear half of the bus cycle, the second drive device (computing means) transmits data transferred on the data bus to the processor. Therefore, during one bus cycle, because it is possible to drive two units of data on the data bus, the efficiency of use of the data bus increases, the execution time for the processing of arithmetics and the like is shortened, and, as a result, the overall performance of the data processing system can be improved.

While the above provides a full and complete disclosure of the preferred embodiments of the present invention, various modifications, alternate constructions and equivalents may be employed without departing from the true spirit and scope of the invention. Therefore the above description and illustration should not be constructed as limiting the scope of the invention, which is defined by the appended claims.

What is claimed is:

1. A data processing system comprising:

processor means;

a first device;

a second device;

an address bus and a data bus through which the processor, the first device, and the second device are connected;

state means for checking a front half and a rear half of a bus cycle of the processor means, and generating a control signal indicating the front half and the rear half of the bus cycle; and control means for receiving the control signal from the state means and address data through the address bus, and based on the received address data for outputting a signal indicative of the first device to transmit data and indicative of the second device to receive the data transmitted from the first device during the front half of the bus cycle, and for outputting a signal indicative of the second device to transmit data to the processor during the rear half of the bus cycle.

2. A data processing system as claimed in claim 1, wherein a high level of the control signal indicates the front half of the bus cycle and a low level of the control signal indicates the rear half of the bus cycle.

3. A data processing system as claimed in claim 1, wherein the processor means and the state means operate in synchronism with a clock signal transmitted from an external device, and the state means checks the front half of the bus cycle and the rear half of the bus cycle at a rising edge of the clock signal.

4. A data processing system as claimed in claim 1, wherein the control means is a bus controller for receiving address data indicating the first device and the second device to be accessed through the address bus and the first device is a Random Access Memory for transmitting data stored therein based on the control of the control means and the second device is an arithmetic device.

5. A data processing system comprising:

processor means;

first to n-th devices;

an address bus and a data bus through which the processor means and the first to n-th devices are connected;

state means for checking a front half and a rear half of a bus cycle of the processor means, and generating a control signal indicating the front half and the rear half of the bus cycle; and control means for receiving address data through the address bus and transmitting a device control signal to the first to n-th devices to be accessed, and when the bus cycle executed by the processor means is a bus cycle for accessing one of the n-th devices indicated by the device control signal transmitted from the control means and the control signal from the state means indicates the front half of the bus cycle, the control means controls one of the first to n-th devices which are not selected by the device control means to transmit data therein and controls the one of the n-th devices indicated by the device control signal to receive the data through the data bus, and when the bus cycle executed by the processor means is a bus cycle for accessing one of the n-th devices indicated by the device control signal transmitted from the control means and the control signal from the state means indicates the rear half of the bus cycle, the control means controls the one of the n-th devices selected by the address control signal to transmit data to the data bus and controls the processor means to receive the data through the data bus.

6. A data processing system as claimed in claim 5, wherein the first to n-th devices comprises first and second Random access memories and an arithmetic device.

7. A data processing system as claimed in claim 5, wherein a high level of the control signal indicates the front half of the bus cycle and a low level of the control signal indicates the rear half of the bus cycle.

8. A data processing system as claimed in claim 5, wherein the processor means and the state means operate in synchronism with a clock signal transmitted from an external device, and the state means checks the front half of the bus cycle and the rear half of the bus cycle at a rising edge of the clock signal.

9. A data processing system comprising:

a processor;

an arithmetic unit;

a random access memory;

a system bus through which said processor, said arithmetic unit and said randam access memory are interconnected in order to carry out data exchange thereamong;

a bus controller connected to said processor, said arithmetic unit and said randam access memory for controlling read/write operations thereof via said system bus; and a state generation logic unit connected to said bus controller and said system bus for generating a state signal indicating a front half or a rear half of a bus cycle, wherein said processor initiates the bus cycle by outputting to said bus controller through said system bus an information signal indicative of an operation to be performed and a necessary address, and wherein said bus controller controls data exchange between said arithmetic unit and said randam access memory in accordance with said information signal and said state signal generated by said state generation logic unit.

10. The data processing system as claimed in claim 9, wherein said system bus includes a data bus, an address bus and a control bus.

11. The data processing system as claimed in claim 9, wherein said processor receives data through said system bus at an end of said bus cycle after completing an arithmetic operation in said arithmetic unit.

* * * * *